June 12, 1956     R. G. NESTER     2,749,934
VALVE FOR ACCURATELY CONTROLLING MINUTE FLUID
FLOW AT LOW PRESSURES AND ITS PRODUCTION
Filed July 7, 1953
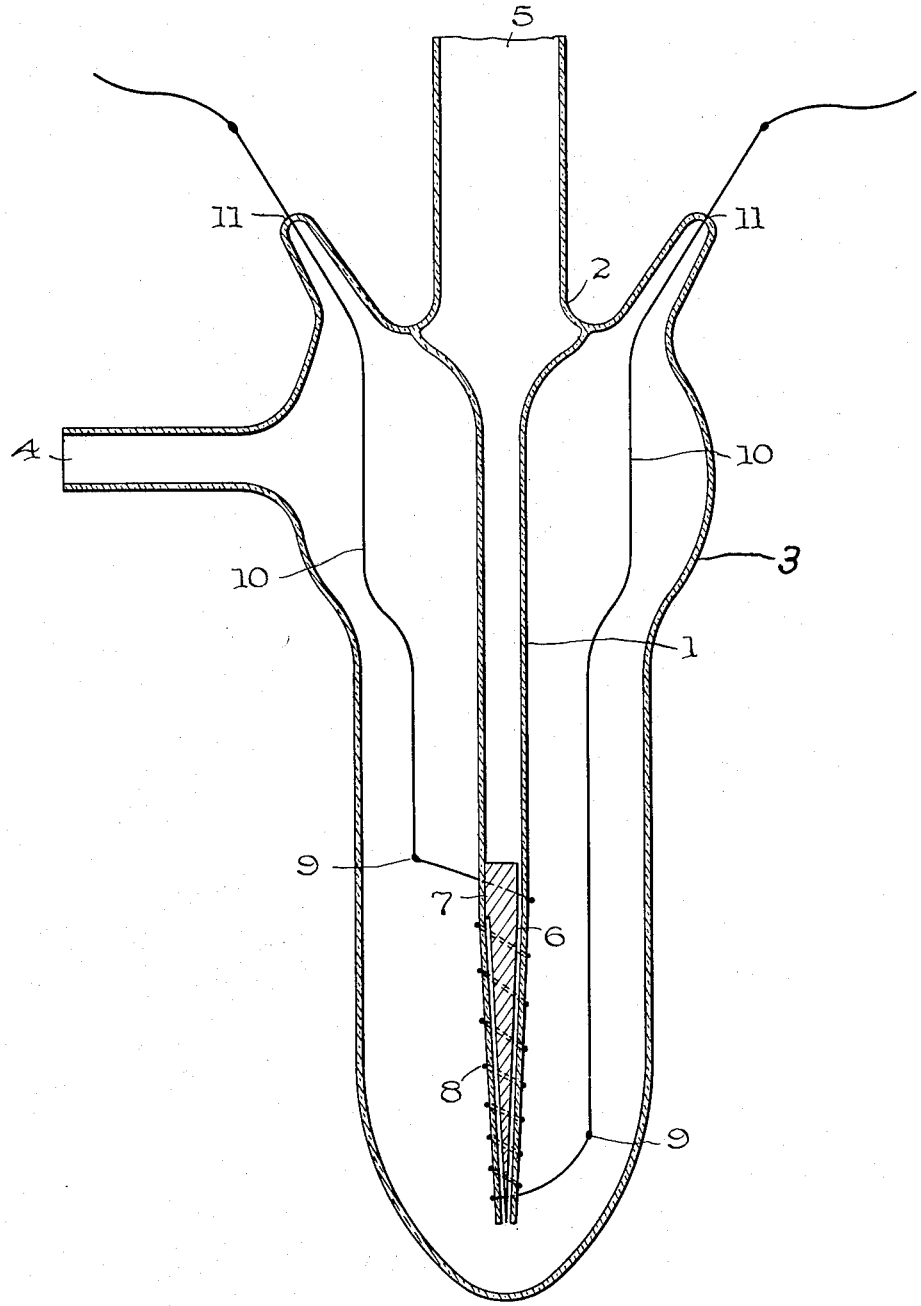
INVENTOR.
RALPH G. NESTER
BY Frederick Schafer
ATTORNEY

United States Patent Office 2,749,934
Patented June 12, 1956

2,749,934

VALVE FOR ACCURATELY CONTROLLING MINUTE FLUID FLOW AT LOW PRESSURES AND ITS PRODUCTION

Ralph G. Nester, Wilmington, Del., assignor to E. I. du Pont de Nemours and Company, Wilmington, Del., a corporation of Delaware Application July 7, 1953, Serial No. 366,600

5 Claims. (Cl. 137—1)

This invention relates to a valve for controlling the flow of a fluid between two systems maintained at different pressures. More particularly this invention relates to a valve for accurately controlling the flow of small amounts of gas between two systems maintained at different pressures wherein one of said systems is maintained at extremely low pressures.

In certain operations it is necessary to introduce accurately controlled small amounts of a gas into a high vacuum system. With the ordinary types of valves or stopcocks, this is very difficult to do at moderately low pressures and is impossible to do at extremely low pressures, i. e., at pressures below $10^{-5}$ mm. of mercury. A valve has been proposed (U. S. Patent 2,608,996) for use in the manufacture of gas-filled electron tubes which consists of two concentric glass tubes. The inner tube is cut at its center with the adjoining ends optically ground and the extremities of the inner tube are joined to the ends of the outer tube. The outer tube is heated by an electrical resistance coil which causes the outer tube to expand and thus separate the optically ground surfaces of the inner tube. This type of valve is operable at pressures down to $10^{-6}$ mm. of mercury, but is not sensitive enough for operation at lower pressures, e. g., pressures of $10^{-9}$ to $10^{-10}$ mm. of mercury, which are necessary for certain operations.

It is an object of this invention to provide a valve for controlling the flow of a fluid, i. e., a gas or liquid, between two systems maintained at different pressures. A further object is to provide a valve for accurately controlling the flow of small amounts of a gas between two systems maintained at different pressures wherein one of said systems is maintained at extremely low pressures. A still further object is to provide a simple and accurate valve for controlling the flow of minute amounts of a fluid into a closed system at an extremely low pressure. Another object is to provide a valve not requiring optically ground glass surfaces for the valve seat. Still another object is to provide a relatively simple method for making a valve for accurately controlling the flow of minute amounts of a gas into a closed system at an extremely low pressure. Other objects will appear hereinafter.

These and other objects of this invention are accomplished by providing a valve for accurately and minutely controlling the flow of small amounts of a fluid at low pressure which comprises a jacket having inlet and outlet openings, a hollow tube joined to said inlet opening and extending within said jacket, said hollow tube having a tapered portion opening into said jacket and consisting of a material having a relatively low coefficient of thermal expansion, a solid tapered plug secured within said tapered portion and normally spaced therefrom forming a path for the flow of fluid, said solid tapered plug consisting of a material having a relatively high coefficient of thermal expansion, and heating means adjacent said hollow tube whereby said tapered plug can be thermally and differentially expanded into contact with the tapered portion of said hollow tube and the flow of fluid therethrough accurately and minutely controlled.

It has now been found that a simple valve for accurately controlling the admission of minute amounts of a fluid into a closed system at an extremely low pressure is provided by this invention. The novel valve of this invention comprises a solid tapered plug of a material having a relatively high coefficient of thermal expansion closely fitted inside a tapered hollow tube of a different material having a relatively low coefficient of thermal expansion. The plug is fastened at part of its thickest end to the outer tube, and the tip of the tapered tube is surrounded by a wire resistance heater. The materials of construction of the plug and the hollow tube are selected so that the coefficient of thermal expansion of the tube is less than that of the plug.

When the valve is heated by passing an electric current through the resistance wire, the plug expands to a greater extent than the tube and at a moderately elevated temperature completely seals the opening between the plug and the tube. As the temperature of the valve is reduced, the plug shrinks away from the tube and any desired minute amount of fluid ranging from a few molecules to a steady stream can be transferred through the valve from a system of higher pressure to one of lower pressure. The exact amount of fluid transferred will depend on the exact temperature of the valve, the difference in coefficients of expansion of the tube and plug, and the difference in pressure between the two systems.

In a preferred embodiment of the invention, the tapered plug is a metal such as copper, which has a coefficient (linear) of thermal expansion of $14.09 \times 10^{-6}$ cm./° C., and the tapered tube is made of glass, which has a coefficient of thermal expansion of $3.6 \times 10^{-6}$ cm./° C. This particular form of valve is so sensitive in its operation that any small quantity of gas ranging from a few molecules to a steady stream can be introduced into an evacuated system having a pressure as low as $10^{-9}$ or $10^{-10}$ mm. of mercury and the pressure in the system can be maintained at that point indefinitely.

To illustrate the invention in detail, reference is made to the accompanying drawing which is a vertical elevation, largely in section and greatly enlarged, of a preferred embodiment of the valve in an open position.

Referring to the drawing, reference numeral 1 designates a tapered capillary tube, for example of glass, which has a coefficient of thermal expansion of $3.6 \times 10^{-6}$ cm./° C., such as that known commercially as "Nonex." This tapered tube is sealed at its upper end to a larger diameter glass tube 2 and to a surrounding jacket 3 of a heat-resistant glass, such as that known commercially as "Pyrex." This jacket 3 has an outlet opening 4 which leads to a closed evacuated system into which a gas is to be introduced. The inlet opening 5 at the end of tube 2 leads to a closed system containing the gas to be introduced. The solid tapered plug 6 is made of a metal having a coefficient of thermal expansion slightly greater than that of the tapered glass tube. An example of such a metal is copper which has a coefficient of thermal expansion of about $14.09 \times 10^{-6}$ cm./° C. A difference in coefficient of thermal expansion of about $10 \times 10^{-6}$ cm./° C. is satisfactory, although the valve is operable with two materials differing to a greater or less degree in coefficients of thermal expansion. This solid tapered plug is fastened at point 7 to the outer tapered tube 1 at this one place only. An electrical resistance heating coil 8 is placed around the lower end of the tapered tube and joined at points 9 to electrical lead-in wires 10 composed of tungsten or some other metal having a coefficient of thermal expansion such that a tight seal can be obtained where the lead-in wire passes through the outer jacket at points 11.

In operation, the valve is closed by passing an electric current through the heating coil 8 until the temperature of the valve is such that the metal plug 6 is expanded to completely fill and seal the opening in the tapered tube 1. This can be done by raising the temperature of the valve a moderate amount, e. g., up to 100–150° C. The exact temperature required depends on the difference in the thermal expansion of the tapered plug and tube. The valve can then be opened by lowering its temperature. The sensitivity of this valve is so great that the valve can be opened only enough to allow the passage of a few molecules of the gas by lowering the temperature of the valve a few degrees. A larger amount of gas flow is obtained by reducing the temperature of the valve still more.

A valve of the type depicted in the drawing is conveniently prepared as follows from copper wire, which has a coefficient of thermal expansion of $14.09 \times 10^{-6}$ cm./°C., and glass tubing, which has a coefficient of thermal expansion of $3.6 \times 10^{-6}$ cm./°C., such as that known commercially as "Nonex." Copper wire of about 0.01 to 0.02 cm. diameter and glass tubing having an outside diameter of about 6 mm. and an inside diameter of about 1 to 2 mm. and somewhat greater than the diameter of the wire, are quite satisfactory. After thoroughly cleaning with chromic acid, the glass tubing is heated by means of a glass blower's torch and drawn out at one end to a capillary having an inside diameter slightly greater than the diameter of the copper wire. The copper wire, having a length of about 2 to 3 cm., is hydrogen fired, i. e., heated to about 700° C. in a stream of hydrogen, before inserting it into the valve section, i. e., the capillary section, of the glass tube. The valve section is then heated over a length of about 6 mm. by a hand torch to a temperature where the glass will flow and the copper wire will melt. At this point the glass and copper are drawn out to form a slight taper in the valve section, the taper being about 1 cm. in length.

After cooling, the glass tube is sealed at the large end to a vacuum system and the pressure reduced to about 0.001 mm. of mercury. The valve section is then heated by means of a hand torch over a length of about 3 mm. and the capillary tube with the copper wire in its center is drawn out into a further taper about 5 mm. in length. During this heating, which is the minimum necessary to soften the glass enough to draw it out into a capillary, the external pressure forces the glass into intimate contact with the tapered copper wire. The upper part of the tapered valve section is then heated on one side only with a small flame from a hand torch to seal the upper end of the copper wire to the outer glass capillary. After cooling, the tapered glass valve is carefully cut with a glass-cutting knife at a point about 1 to 2 mm. above the end of the copper wire. During this last cooling the copper wire shrinks away from the narrow part of the capillary tube due to the greater contraction of the copper. The tapered glass tube containing the copper plug is then wrapped with a coil of resistance wire, e. g., platinum, and the entire assembly with the electrical lead-in wires sealed into a jacket 3 of suitable shape such as illustrated in the drawing.

The valve of this invention has been illustrated with reference to its construction from a specific pair of materials, viz., a tapered glass tube and a tapered copper plug, having a difference in coefficient of thermal expansion of about $10 \times 10^{-6}$ cm./°C. However, the valve is not limited to being constructed of these two specific materials. Other types of glass and other types of metal can be used, the only requirement being that the metal used have a higher coefficient of thermal expansion than the coefficient of thermal expansion of the glass. For example, the plug can be made of gold, silver, and various alloys, and the tapered tube can be of any of various known types of glass. The jacket 3 can also be made of plastic or other material as well as of heat-resistant glass.

Still other combinations of materials can be used in making the tapered tubes and plugs comprising the valve of this invention. For example, tapered glass tubes can be fitted with tapered plastic plugs of materials such as polytetrafluoroethylene, nylon, polyethylene, and the like, and tapered metal tubes can be fitted with tapered plastic plugs. Two metals having different coefficients of thermal expansion can also be used for the tapered plugs and tapered tubes.

In making the valves of this invention by the method described above in detail for the glass-copper valve, it is necessary to use two materials which soften at approximately the same temperature so that they can be drawn together to form the closely fitting surfaces required for accurately controlling the flow of the most minute quantities of gas. The two materials must also be of such a nature that, when cooled, the plug separates slightly from the tapered tube. Two metals or plastics which fuse or weld together during the drawing step cannot be used in this method since in this case the valve would remain closed on cooling.

The extremely high sensitivity of the valves made as described above is due to the exact fit of the inner tapered plug into the outer tapered tube when the valve is closed. In this method of making the valves the surfaces of the plug and tube are in intimate contact when the assembly is heated to softening temperature and drawn into the final tapered form. Thus, when cooled, the contact surfaces are exact replicas of each other. Consequently, when the valve is reheated by the electric coil heater, the tapered plug expands into the tapered tube with clearances between the surfaces of less than molecular dimensions. Such a fit can not be obtained by conventional methods of machining, grinding and polishing separate valve plugs and seats.

While the above-described method of making the valves of this invention is the preferred method of making valves having the greatest sensitivity, i. e., valves capable of precisely controlling the flow of very minute quantities of gas into systems of extremely low pressure, other methods of construction can be used. For example, for valves to be used at pressures higher than approximately $10^{-6}$ mm. of mercury, and for controlling the passage of larger quantities of gas or liquid, valves can be made by carefully grinding or machining a tapered plug of one metal to fit into a tapered tube of another metal having a smaller coefficient of thermal expansion. In selecting the two materials from which the plugs and the tubes are to be made, it is essential to select materials having sufficient differences in coefficients of thermal expansion. The greater the difference in the coefficient of thermal expansion, the greater is the capacity of the valve, i. e., the greater is the volume of fluid that can be passed through the valve when it is open, and the lower is the change in temperature required to regulate the valve. On the other hand, when the difference in the coefficient of thermal expansion of the plug and the outer tube is small, the smaller is the amount of fluid that can be passed through the open valve, but the exact quantity of fluid passed through can be controlled much more accurately.

The valves of this invention are useful in controlling the passage of a fluid into systems of extremely low pressure, i. e., pressures of from $10^{-6}$ to $10^{-10}$ mm. of mercury, and when extremely minute amounts of gas must be admitted to evacuated systems. They are especially useful in such applications as controlling the introduction of minute amounts of gas into the field emission electron microscope. However, the valves can be used at higher pressures, for example, at pressures of $10^{-2}$ mm. of mercury, at pressures in the range of 1 to 10 mm. of mercury, and even at superatmospheric pressures.

As many apparently widely different embodiments of this invention may be made without departing from the spirit and scope thereof, it is to be understood that this invention is not limited to the specific embodiments thereof except as defined in the appended claims.

I claim:

1. In a valve, a hollow tube having a tapered portion open at the end and consisting of a material having a relatively low coefficient of thermal expansion, a solid tapered plug extending within said tapered portion and normally spaced therefrom forming a path for the flow of fluid, said solid tapered plug being secured at a part of one side only adjacent its larger end to said hollow tube and consisting of a material having a relatively high coefficient of thermal expansion, and heating means adjacent said hollow tube whereby said solid tapered plug can be thermally and differentially expanded into contact with the tapered portion of said hollow tube and the flow of fluid therethrough accurately and minutely controlled.

2. In a gas valve, a hollow tube having a tapered portion open at the end and consisting of glass having a relatively low coefficient of thermal expansion, a solid tapered plug extending within said tapered portion and normally spaced therefrom forming a path for the flow of gas, said solid tapered plug being secured at a part of one side only adjacent its larger end to said hollow tube and consisting of copper having a relatively high coefficient of thermal expansion, the contact surface of said glass tapered portion being a molded replica of the contact surface of said solid tapered copper plug, and electric wire heating means surrounding the tapered portion of said hollow tube whereby said solid tapered plug can be thermally and differentially expanded into contact with the tapered portion of said hollow tube and the flow of gas therethrough accurately and minutely controlled.

3. A valve for accurately and minutely controlling the flow of small amounts of a fluid at low pressure which comprises a jacket having inlet and outlet openings, a hollow tube joined to said inlet opening and extending within said jacket, said hollow tube having a tapered portion opening into said jacket and consisting of a material having a relatively low coefficient of thermal expansion, a solid tapered plug extending within said tapered portion and normally spaced therefrom forming a path for the flow of fluid, said solid tapered plug being secured at a part of one side only adjacent its larger end to said hollow tube and consisting of a material having a relatively high coefficient of thermal expansion, and heating means adjacent said hollow tube whereby said solid tapered plug can be thermally and differentially expanded into contact with the tapered portion of said hollow tube and the flow of fluid therethrough accurately and minutely controlled.

4. A valve for accurately and minutely controlling the flow of small amounts of a gas at low pressure which comprises a glas jacket having inlet and outlet openings, a hollow tube joined to said inlet opening and extending within said jacket, said hollow tube having a tapered portion and consisting of glass having a relatively low coefficient of thermal expansion, a solid tapered plug extending within said tapered portion and normally spaced therefrom forming a path for the flow of gas, said solid tapered plug being secured at a part of one side only adjacent its larger end to said hollow tube and consisting of copper having a relatively high coefficient of thermal expansion, the contact surface of said glass tapered portion being a molded replica of the contact surface of said solid tapered copper plug, and electric wire heating means surrounding the tapered portion of said hollow tube whereby said solid tapered plug can be thermally and differentially expanded into contact with the tapered portion of said hollow tube and the flow of gas therethrough accurately and minutely controlled.

5. A method for making a gas valve which comprises placing a copper wire inside a capillary glass tube, the diameter of said copper wire being slightly less than the inside diameter of said capillary glass tube, heating said capillary glass tube containing the copper wire until the glass and copper are softened, drawing out the capillary glass tube to form a tapered glass tube with the copper wire being drawn at the same time to form a tapered copper wire plug having its surface in intimate contact with the inside surface of said tapered glass tube, fusing the thickest part of the copper wire at one spot to the capillary glass tube, then cooling said tapered glass tube and shrinking said copper wire plug therefrom to form a space for the flow of gas therethrough.

References Cited in the file of this patent

UNITED STATES PATENTS

| | | |
|---|---|---|
| 2,608,996 | Forman | Sept. 2, 1952 |
| 2,610,300 | Walton | Sept. 9, 1952 |